United States Patent [19]

Lepert

[11] 3,987,123

[45] Oct. 19, 1976

[54] PETROLEUM RESINS

[75] Inventor: Andre Lepert, Rhode-Saint-Genese, Belgium

[73] Assignee: Exxon Research and Engineering Company, Linden, N.J.

[22] Filed: Feb. 27, 1975

[21] Appl. No.: 553,599

[30] Foreign Application Priority Data

Mar. 4, 1974 United Kingdom................. 9571/74

[52] U.S. Cl............................. 260/878 R; 260/879; 526/76

[51] Int. Cl.²................ C08F 240/00; C08F 255/00; C08F 279/00

[58] Field of Search.................. 260/878 R, 879, 82; 526/76

[56] References Cited

UNITED STATES PATENTS

| | | | |
|---|---|---|---|
| 2,798,865 | 7/1957 | Banes et al. | 260/82 |
| 3,709,854 | 1/1973 | Hepworth et al. | 260/82 |
| 3,817,953 | 6/1974 | Younger | 260/82 |
| 3,905,948 | 9/1975 | Vargiu et al. | 260/82 |

*Primary Examiner*—Alan Holler
*Attorney, Agent, or Firm*—R. N. Field; Rebecca Yablonsky

[57] ABSTRACT

High softening point resins are prepared by a process which comprises polymerizing in the presence of a Friedel-Crafts catalyst a mixture of (1) a feedstock comprising $C_5$ olefins and diolefins, $C_6$ olefins and diolefins or a mixture of $C_5$ and $C_6$ olefins and diolefins, said feedstock being obtained from the steam-cracking of petroleum feedstock and (2) a polymer obtained by the thermal or cationic polymerization of dicyclopentadiene, an alkyl cyclopentadiene dimer, a codimer of cyclopentadiene with an alkyl cyclopentadiene, a codimer of cyclopentadiene or an alkyl cyclopentadiene with a $C_5$ or a $C_6$ conjugated linear or non-cyclic diolefin, or a mixture of said dimer and codimers. The resin may be mixed with rubber to make a pressure-sensitive adhesive.

18 Claims, No Drawings

PETROLEUM RESINS

This invention relates to a process for the preparation of high softening point petroleum resins.

In certain applications, e.g. in printing inks, it is desirable to use resins with a high softening point, e.g. greater than 150° C, and also having a good solubility in aliphatic solvents and an acceptable solvent release.

We have now discovered a process by which resins are obtained having the above-mentioned properties.

According to this invention high softening point resins are obtained by a process which comprises polymerising using a Friedel-Crafts catalyst, a mixture of:

1. a feedstock comprising $C_5$ olefins and diolefins, $C_6$ olefins and diolefins or a mixture of $C_5$ and $C_6$ olefins and diolefins said feedstock being obtained from the steam-cracking of petroleum feedstock and (2 ) a polymer obtained by the thermal or cationic polymerisation of dicyclopentadiene, an alkyl cyclopentadiene dimer, a codimer of cyclopentadiene with an alkylcyclopentadiene, a codimer of cyclopentadiene or an alkyl cyclopentadiene with a $C_5$ or a $C_6$ conjugated linear or non-cyclic diolefin or a mixture of said dimers and codimers. These dimers and codimers are produced during the thermal Diels Alder reaction of feedstocks containing conjugated $C_5$ and $C_6$ diolefins (1) as for example isoprene or pentadienes 1, 3 as well as cyclopentadiene and alkyl cyclopentadiene.

The $C_5$ or $C_6$ diolefin and olefin-containing feedstock is obtained from the steam cracking of petroleum feedstock. Such feedstocks include naphtha, kerosene, gas oil, and vacuum gas oil. These feedstocks usually have a boiling point range of from 20° to 410° C.

The petroleum feedstock is cracked in the presence of steam and the preferred cracking temperature is between 500° and 870° C. The product which contains unsaturated hydrocarbons usually boiling in the range 20° to 240° C, e.g. 20° to 130°, is then preferably subjected to fractionation to remove $C_2$ to $C_4$ light ends, thermal soaking and distillation so as to remove hydrocarbons such as cyclic diolefins including cyclopentadiene and methyl cyclopentadiene as dimers.

After thermal soaking and distillation one obtains an overhead naphtha which usually boils from 30° to 110° C, e.g. 30° to 80° C. This overhead naphtha comprises mainly $C_5$ diolefins such as isoprene and 1, 3 cis-and trans-pentadienes, $C_5$ to $C_6$ monoolefins and aromatics, for example benzene. In general the overhead naphthas have the following composition but the exact composition obviously depends on the nature of the petroleum feedstock which is subjected to steam-cracking:

| | % by weight |
|---|---|
| Total paraffins | 1.0 to 41.5 |
| Total diolefins | 35.5 to 14.5 |
| Total olefins | 33.5 to 13.0 |
| Total aromatics | 30.0 to 31.0 |
| Isoprene | 16.5 to 6.5 |
| Pentadiene 1, 3 | 14.5 to 4.5 |
| Cyclopentadiene | 1.0 to 2.5 |

The feed could be significantly isoprene free provided this compound was previously recovered through any conventional extraction process such as extractive distillation. However mixture of diolefins and monoolefins and their good balance in the feed is essential, giving only "gel" like crosslinked insoluble polymers and liquid oligomers.

The second component of the mixture to be polymerised is a polymer obtained by the thermal or cationic polymerisation of dicyclopentadiene, an alkyl cyclopentadiene dimer, a codimer of cyclopentadiene with an alkyl cyclopentadiene or codimers of $C_5$ and $C_6$ conjugated linear or non-cyclic diolefins with cyclopentadiene or an alkyl cyclopentadiene. The dimers or codimers can be obtained from the heat soaking process mentioned above. Usually the alkyl cyclopentadiene is methyl cyclopentadiene and usually it is a stream which comprises both dicyclopentadiene and methyl cyclopentadiene dimer which is subjected to thermal or cationic polymerisation. These streams which are subjected to thermal or cationic polymerisation usually having a boiling range of from 80° to 220°, e.g. 80° to 180° C and can be obtained as the bottoms from the fractionation tower used in the preparation of the first component of the mixture to be polymerised. Codimers derived from the thermal Diels Alder reaction between cyclopentadiene and/or alkyl cyclopentadiene and $C_5$ diolefins such as isoprene and/or pentadienes 1, 3 are also present but at a lower concentration in the feed subjected to thermal or cationic polymerisation.

The thermal polymerisation should take place at a temperature of between 200° and 280° C and for 1 to 8 hours. Cationic polymerisation should take place at a temperature of between −30° C and 70° C and for ¼ to 2 hours. Longer polymerisation time and/or higher temperature have to be avoided because they lead to the production of high softening point resins (S.P. ° C higher than 150° C by Ring and Ball method) which, however are insoluble in aromatics free aliphatic solvents. The polymer or polymer concentrate produced from the thermal or cationic polymerisation of the above described 80° – 180° C cut containing aromatics or substituted aromatics such as benzene, toluene, xylenes may comprise oligomers of at least four monomer units.

A typical dimer-containing stream which is subjected to thermal or cationic polymerisation is:

| | WT % |
|---|---|
| Cyclopentadiene/$C_5$ diolefins codimers | 5 |
| Dicyclopentadiene | 50 |
| Methyl Cyclopentadiene/$C_5$ diolefin codimers | 4 |
| Methyl cyclopentadiene dimers | 3 |
| Cyclopentadiene/methyl cyclopentadiene codimers | 10 |
| Aromatics | 24 |
| Olefins and paraffins | 4 |

The thermal or cationic polymer which is obtained may be used as such in the polymerisation process of this invention. However if desired unreactive compounds and low boiling oligomers may first be removed by steam stripping, and in these conditions the resulting polymer usually has a softening point of from 50° to 150° C, preferably 80° to 90° C. Then the steam stripped resin can be dissolved in any conventional solvent, e.g. white spirit, paraffinic and/or olefinic rich streams, and aromatic or chlorinated solvent, at the desired concentration. Polar solvents such as oxygenated compounds which could further complex the necessary Friedel-Crafts catalyst are not recommended.

Thermal polymerisation is preferred but cationic polymerisation is feasible provided that adequate conditions are used. However the polymer produced has different properties (high Gardner colour and wider molecular distribution) and is less reactive for further copolymerisation with the $C_5$ or $C_6$ diolefins and olefins stream. Additionally if manufacturing conditions are not carefully controlled solubility problems due to gel production as well as lower resin yield are met.

The two components i.e. the steam-cracked feedstock and the thermal or cationic polymer, are mixed e.g. in a weight ratio of between 10:1 and 1:1 preferably 5.5:1 to 1.5:1 (thermal or cationic polymer content in the final resin varying from 15 to 80% preferably 35 to 60 wt.%).

The two components are polymerised using a Friedel Crafts catalyst, for example aluminium chloride, aluminium bromide, or a liquid aluminium chloride/hydrochloric acid/substituted aromatics complex, the aromatic being for example o-xylene, mesitylene, ethyl benzene, isopropyl benzene and the like such as short or long chain alkylbenzenes. The alkyl chain could be linear or branched and could vary from 2 to 30 carbon atoms. Acidic liquid $AlCl_3$ sludges obtained as by-products during the alkylation of benzene or any other substituted aromatics (toluene, xylenes) with branched chain olefins could be directly used as catalyst for the above described polymerisation process. The branched chain olefins could be produced via the boron trifluoride oligomerisation of propylene and fractionation: e.g. $C_{12}$ olefins or $C_{24}$ olefins could be then alkylated with aromatics producing in situ sludge. As example the acidic sludge available from a dodecylbenzene plant provided similar results as the preformed O-xylene/$AlCl_3$/HCl liquid complex.

The amount of catalyst used may vary from 0.25 to 3.0 wt.%, preferably 0.5 to 1.5 wt.%, based on the weight of the mixture to be polymerised. Usual polymersation temperatures are between −20° and +100° C, preferably between 0° and 80° C.

After polymerisation the residual catalyst may be removed by for example washing with aqueous solution of alkali, ammonia or sodium carbonate, or by the addition of an alcohol such as methanol and subsequent filtration.

The final resin may then be stripped of unreacted hydrocarbons ("raffinate" rich in benzene and/or paraffins/unreactive olefins) and low molecular weight oily oligomers by steam stripping or vacuum distillation. The finished product is a substantially non-aromatic unsaturated hydrocarbon resin. It usually has a softening point of from 50° to 250° C, especially 120° to 170° C.

The resin obtained can be used in many applications. Thus, before or after chemical modification with polar compounds such as phenols or maleic anhydride they may be used for the manufacture of printing ink. They may also be used for road marking, hot melts, floor tiles after binding with mineral fillers, coatings, pressure sensitive adhesives and hot melt adhesives.

Concerning pressure sensitive adhesives, the resin is mixed with a rubber, e.g. natural rubber, in a weight ratio of from example 30:100 to 100:30 e.g. 50:50. These pressure sensitive adhesives have improved cohesive strength (shear adhesion test) compared with previously used pressure sensitive adhesives.

In order to obtain pressure sensitive adhesives with improved adhesive strength the process of this invention may be modified by adding to the mixture to be polymerised using a Friedel-Crafts catalyst, a branched chain reactive monoolefin, for example isobutene, a methyl butene, U.O.P. olefins or diisobutene. The branching can be either on the double bond or in the α position. The chain length can vary from 4 to 30 carbon atoms, but preferably 4 to 8. When branched chain reactive monoolefin is used the amount used can vary from 30% to 400% e.g. about 80 to 100% by weight of the amount of thermal or cationic polymer in the polymerisation mixture.

EXAMPLE 1

A high softening point petroleum resin was prepared by polymerising a mixture of a steam cracked feedstock with a dicyclopentadiene and methylcyclopentadiene dimer derived polymer concentrate.

The steam-cracked feedstock contained the following amounts of major constituents:

| | | |
|---|---|---|
| Paraffins | wt. % | 2.45 |
| Diolefins $C_5/C_6$ (1) | wt. % | 34.60 |
| Olefins $C_5/C_6$ (2) | wt. % | 32.65 |
| Aromatics | wt. % | 29.90 |
| Unidentified | wt. % | 0.50 |
| Isoprene | wt. % | 15.45 |
| Pentadiene 1, 3 trans | wt. % | 8.30 |
| Pentadiene 1, 3 cis | wt. % | 5.10 |
| Cyclopentadiene | wt. % | 1.00 |
| Benzene | wt. % | 29.90 |

(1) Mainly $C_5$ diolefins i.e. isoprene and pentadienes 1, 3 cis and trans
(2) Mainly $C_5$ olefins i.e. 2-methylbutene -1, 2-methyl butene-2 and pentene-1.

The thermal polymer of cyclopentadiene and methylcyclopentadiene dimers was a concentrate in solvent i.e. 70 wt.% polymer and 30 wt.% solvent white spirit. The polymer had a softening point of about 80° C.

The catalyst which was used was a complex aluminium trichloride, hydrogen chloride and o-xylene and was prepared as follows:

Gaseous dry hydrochloric acid was bubbled through a very well stirred $AlCl_3$/o-xylene mixture (1 mole of each). $AlCl_3$ was progressively dissolved while HCl was absorbed in the reaction medium until 0.5 mole was reacted.

The composition of this liquid complex was as follows:

| | | |
|---|---|---|
| $AlCl_3$ | wt. % | 51.8 |
| o-xylene | wt. % | 41.2 |
| HCl | wt. % | 7.0 |

The solvent which was used to dissolve the polymerisation reactants had the following composition:

| | | |
|---|---|---|
| Paraffins | wt. % | 23.50 |
| Diolefins | wt. % | 4.20 |
| Olefins | wt. % | 15.30 |
| Benzene | wt. % | 57.00 |

Table 1 gives the reaction conditions for five separate runs, and Table 2 gives the properties of the resins obtained, including when used in the preparation of pressure sensitive adhesives. As identified through the shear adhesion test the cohesive strength of the pressure sensitive adhesive formulation based on natural rubber was significantly improved.

TABLE I

Manufacturing Conditions of high softening point Resins (Semi-batch polymerizations) $AlCl_3$/HCl/o-xylene complex as catalyst

| Manufacturing conditions | RUN 1 | 2 | 3 | 4 | 5 |
|---|---|---|---|---|---|
| Hydrocarbon resin feed (wt %) | 75.0 | 66.6 | 60.0 | 50.0 | 42.8 |
| Cyclodienes polymer concentrate (wt %) (1) | 12.5 | 16.7 | 20.0 | 25.0 | 28.6 |
| Solvent (wt %) | 12.5 | 16.7 | 20.0 | 25.0 | 28.6 |
| $AlCl_3$ (wt % on total feed) | 0.75 | 0.75 | 0.75 | 0.75 | 0.75 |
| Temperature (°C) | 55 | 55 | 55 | 55 | 55 |
| Residence time (min) | 90 | 90 | 90 | 90 | 90 |
| Theoretical resin yield (wt % on total feed) (2) | 42.4 | 41.7 | 41.0 | 40.0 | 39.2 |
| Experimental resin yield (wt % on total feed) | 40.5 | 40.5 | 39.4 | 38.5 | 38.2 |
| Fill yield (wt % on total feed) | 7.2 | 4.2 | 5.4 | 6.8 | 7.5 |
| Gel yield (wt % on total feed) | 0 | 0 | 0 | 0 | 0 |
| Cyclodiene polymer in high softening point resin (wt %) | 20.4 | 28.0 | 34.2 | 42.6 | 51.0 |

(1) Concentration of polymer in white spirit = 70 wt % - Softening point of polymer 80° C
(2) Experimental resin yield from hydrocarbon resin feed = 45 wt %.

TABLE 2

Properties of high softening point Resins

| | Reference | RUN 1 | 2 | 3 | 4 | 5 |
|---|---|---|---|---|---|---|
| Cyclodienes in total feed wt % | 0 | 8.7 | 11.7 | 14.0 | 17.50 | 20.0 |
| Gardner colour (50 wt % resin in toluene) | 6.5 | 9 | 10 | 10 | 10.5 | 10.5 |
| Softening point ° C (Ring and Ball Method) | 99 | 112 | 135 | 145 | 158 | 65 |
| Pressure sensitive adhesive properties* | | | | | | |
| 180° Peel strength (1) (lb/inch) | 2.20 | 2.05 | 1.95 | 1.95 | 1.95 | 2.05 |
| Polyken tack (grms) | 750 | 750 | 300 | 100 | 100 | 100 |
| Rolling ball tack (2) (cm) | 8 | 25 | >30 | >30 | >30 | >30 |
| Shear on paper as substrate (3) (hr to failure) | 2 | 10 | 25 | 85 | 87 | 90 |
| Solubility in aliphatics (4) | excellent ← → clear solution | | | | | |
| Solvent release (5) | | | | acceptable 30 min. | acceptable 30 min. | acceptable 30 min. |

According to Pressure sensitive tape Council (PSTC)
Pressure sensitive adhesive based on Natural rubber (Mooney Vicosity 50–65
Resin/rubber ratio: 50/50
(1) PSTC - 1
(2) PSTC - 6
(3) PSTC - 7
(4) After 10 times dilution: absolute solubiity, solution remains clear after 2 weeks storage. Method: 6 g. resin are dissolved in 4 g. Naphtha E containing less than 5 % aromatics.
(5) Method: minimum time for having minimum print after solvent evaporation at room temperature - standard pressure applied - 35 wt % resin concentration in solvent mixture (cyclohexane + Naphtha E: 50/50) Film thickness: 15 mμ Pressure: 45 kg/cm²

EXAMPLE 2

The procedure of Example 1 was repeated, but the thermal polymer used was replaced by either cyclopentadiene monomer (CPD), dicyclopentadiene (DCPD) or methycyclopentadiene dimer (MeCDP) for comparison purposes. From Table 3 it can be seen that satisfactory properties are only obtained with DCPD or MeCPD dimer, the corresponding monomers being precursors of "gel" like crosslinked insoluble polymers.

Also it is ascertained that resin solutions are hazy when the resin softening point is high enough (143° C for DCPD addition and only 120° C with CPD due to gel presence).

It was noticed that even though DCPD and MeCPD dimer gave similar results as their thermal derived polymers, the resin yields were also considerably lower (comparison of theoretical resin yields and experimental ones in Tables 1 and 3).

Table 3

Addition of cyclodienes (monomers and dimers) to hydrocarbon resin feeds - Comparative data $AlCl_3$/HCl/o-xylene complex as catalyst

| | CPD monomer addition | | | DCPD addition | | | | MeCPD dimer addition | | |
|---|---|---|---|---|---|---|---|---|---|---|
| Cyclodienes additive wt % in feed | 0 | 2.5 | 5.0 | 0 | 5.0 | 10 | 15 | 0 | 5 | 10 |
| Cyclodienes in resin wt % | 0 | 6.8 | 13.3 | 0 | 13.2 | 25.4 | 36.5 | 0 | 13.2 | 25.4 |
| Gel (wt % on feed) | 0.2 | 0.2 | 1.0 | 0 | 0 | 0.1 | 0.2 | 0 | 0 | 0.1 |
| Gardner colour (50 wt. % resin in toluene | 6 | 7+ | 8− | 6.5 | 7− | 7 | 8− | 6.5 | 9+ | 10+ |
| Softening point ° C(Ring+Ball method | 99 | 108 | 120 | 104 | 117 | 128 | 143 | 104 | 120 | 131 |
| Pressure sensitive adhesive properties | | | | | | | | | | |
| 180° Peel strength (1b/inch) | 2.2 | 1.3 | 0.6 | 2.0 | 2.0 | 1.9 | 1.8 | 2.0 | 1.9 | 1.6 |
| Polyken tack (grams) | 550 | 150 | 0 | 500 | 400 | 300 | 250 | 500 | 0 | 250 |
| Ball tack (cm) | 8 | 22 | >30 | >30 | >30 | >30 | 15 | >30 | >30 | >30 |
| Shear (hr) | 2 | 3.5 | 1.5 | 4 | 10 | 39 | 86 | 4 | 16 | 54 |
| Theoretical resin yield wt% | 36.0 | 36.8 | 37.8 | 36.0 | 37.7 | 39.4 | 41.1 | 36.0 | 37.7 | 39.4 |

Table 3-continued

| Addition of cyclodienes (monomers and dimers) to hydrocarbon resin feeds - Comparative data AlCl₃/HCl/o-xylene complex as catalyst | CPD monomer addition | | | DCPD addition | | | | MeCPD dimer addition | | |
|---|---|---|---|---|---|---|---|---|---|---|
| Experimental resin yield wt% | 36.0 | 36.6 | 37.4 | 35.5 | 35.3 | 36.2 | 34.2 | 35.5 | 34.7 | 34.5 |
| Solubility in aliphatics (see Table 2) | clear | clear | hazy | clear | clear | clear | hazy | clear | clear | clear |

EXAMPLE 3

Pressure sensitive adhesives were prepared having improved properties using the same feedstocks for the polymerisation as used in Example 1 plus the addition of U.O.P. light olefins. The improved adhesive strength (180° peel strength test — Table 4) due to combination of DCPD thermal polymer and branched chain olefins were clearly identified (runs 1, 5, 6 and 7). The replacement of DCPD thermal polymer by DCPD or MeCPD dimer provides similar improvement.

Table 4 gives the reaction conditions and the properties obtained in 8 runs and Table 5 gives the analysis of the light U.O.P. olefin.

TABLE 4

| Pressure Sensitive Adhesives Quality Improvement | RUN | | | | | | | |
|---|---|---|---|---|---|---|---|---|
| | 1 | 2 | 3 | 4 | 5 | 6 | 7 | 8 |
| $C_5$-$C_6$ diolefins/olefins stream (wt %) (1) | 80 | 72 | 76 | 72 | 68 | 66 | 56 | 58.4 |
| Benzene solvent (wt %) | 20 | 18 | 19 | 18 | 17 | 16.5 | 21.5 | 14.6 |
| U.O.P. light olefins (wt %) (2) | 0 | 10 | 0 | 0 | 10 | 10 | 8.5 | 15.0 |
| Cyclodienes thermal polymer (wt %) (3) | 0 | 0 | 5 | 10 | 5 | 7.5 | 14 | 12.0 |
| Polymerisation conditions | | | | | | | | |
| $AlCl_3$ powder as catalyst (wt % on total feed) | 0.75 | 0.75 | 0.75 | 0.75 | 0.75 | 0.75 | 0.75 | 0.75 |
| Polymerisation temperature (° C) | 50 | 50 | 50 | 50 | 50 | 50 | 50 | 50 |
| Polymerisation time (min) | 60 | 60 | 60 | 60 | 60 | 60 | 60 | 60 |
| Resin characteristics | | | | | | | | |
| Resin yield wt % | 32.0 | 32.0 | 31.2 | 32.0 | 32.0 | 31.2 | 29.4 | 26.5 |
| Fill yield wt % | 2.5 | 4.5 | 4.0 | 5.0 | 6.2 | 5.4 | 6.0 | 6.6 |
| Softening point ° C | 97 | 87 | 106 | 121 | 97 | 103 | 118 | 103 |
| Gardner colour | 4 | 4.5 | 6+ | 7+ | 5 | 5+ | 7− | 6+ |
| Wax cloud point ° C | | | | | | | | |
| Wax/resin/EVA 250 | | | | | | | | |
| 70/15/15 wt % | 95 | <65 | >250 | >250 | <65 | <65 | <65 | <65 |
| 60/20/20 wt % | | 80 | | | 85 | 85 | 110 | 73 |
| 180° Peel strength (lb/inch) | 1.60 | 1.90 | 1.55 | 1.65 | 2.10 | 2.20 | 2.70 | 2.25 |
| Polyken tack (grams) | 200 | 700 | 100 | 100 | 800 | 700 | 550 | 750 |
| Rolling ball tack (cm) | >30 | 2.5 | 28 | 28 | 6.5 | 9 | 20 | 7 |
| Shear adhesion on paper (hr) | 7 | 3 | 7 | 5 | 2 | 2 | 4.5 | 3 |

(1) see composition previously described in Example 1
(2) produced by polymerisation of propylene with phosphoric acid catalyst
(3) polymer concentration = 60 wt. % in white spirit

TABLE 5

| TYPICAL ANALYSIS OF LIGHT U.O.P. OLEFINS | |
|---|---|
| Specific Gravity at 15°C | 0.684 |
| ASTM distillation (D 86) | |
| IBP °C | 28 |
| 5 vol % | 56 |
| 10 | 66 |
| 20 | 70 |
| 30 | 75 |
| 40 | 80 |
| 50 | 83 |
| 60 | 89 |
| 70 | 95 |
| 80 | 103 |
| 90 | 114 |
| FBP | 121 |
| Olefins content (F.I.A.) (vol %) | 80 |

What is claimed is:

1. A process for preparing a high softening point resin which comprises polymerising in the presence of a Friedel-Crafts catalyst a mixture of (1) a first feedstock comprising $C_5$ olefins and diolefins, $C_6$ olefins and diolefins or a mixture of $C_5$ and $C_6$ olefins and diolefins, said feedstock being obtained from the steam-cracking of a petroleum starting material and (2) a second feedstock being a polymer obtained by the thermal or cationic polymerisation of dicyclopentadiene, an alkyl cyclopentadiene dimer, a codimer of cyclopentadiene with an alkyl cyclopentadiene, a codimer of cyclopentadiene or an alkyl cyclopentadiene with a $C_5$ or a $C_6$ conjugated linear or non-cyclic diolefin, or a mixture of said dimers and codimers.

2. A process according to claim 1 wherein, before the polymer obtained after thermal or cationic polymerisation is polymerised, low boiling oligomers are first removed by steam stripping.

3. A process according to claim 1 wherein feedstock (2) is a thermal polymer.

4. A process according to claim 1 wherein the steam cracked feedstock and thermal or cationic polymer are mixed in a weight ratio of between 10:1 and 1:1 before being subjected to Friedel-Crafts catalysed polymerisation.

5. A process according to claim 4 wherein said weight ratio is between 5.5:1 and 1.5:1.

6. A process according to claim 1 wherein the Friedel-Crafts catalysed polymerisation takes place at a temperature between 0° C and 80° C.

7. A process according to claim 1 wherein a branched chain reactive monoolefin is added to the mixture to be polymerised in the presence of a Friedel-Crafts catalyst.

8. A process according to claim 7 wherein said monoolefin contains 4 to 30 carbon atoms per molecule.

9. A process according to claim 7 wherein the monoolefin comprises light U.O.P. olefins.

10. A process according to claim 7 wherein the amount of branched chain reactive olefin is from 80 to 100% by weight based on the weight of thermal or cationic polymer in the polymerisation mixture.

11. A high softening point resin prepared by a process comprising polymerising in the presence of a Friedel-Crafts catalyst a mixture of (1) a first feedstock comprising $C_5$ olefins and diolefins, $C_6$ olefins and diolefins or a mixture of $C_5$ and $C_6$ olefins and diolefins, said feedstock being obtained from the steamcracking of a petroleum starting material and (2) a second feedstock being a polymer obtained by the thermal or cationic polymerisation of dicyclopentadiene, an alkyl cyclopentadiene dimer, a codimer of cyclopentadiene with an alkyl cyclopentadiene, a codimer of cyclopentadiene or an alkyl cyclopentadiene with a $C_5$ or a $C_6$ conjugated linear or non-cyclic diolefin, or a mixture of said dimers and codimers.

12. A pressure sensitive adhesive comprising rubber and the resin according to claim 11.

13. An adhesive according to claim 12 wherein the weight ratio of resin to rubber is between 30:100 and 100:30.

14. A process for preparing a high softening point resin which comprises polymerizing in the presence of a Friedel-Crafts catalyst a mixture of (1) a first feedstock comprising $C_5$ olefins and diolefins, $C_6$ olefins and diolefins or a mixture of $C_5$ and $C_6$ olefins and diolefins, said feedstock being obtained from the steam-cracking of a petroleum starting material and (2) a second feedstock being a polymer obtained by the thermal or cationic polymerization of a feed comprising both dicyclopentadiene and methylcyclopentadiene dimer.

15. A process according to claim 14 wherein, before the polymer obtained after thermal or cationic polymerization is polymerized, low boiling oligomers are first removed by steam stripping.

16. A process according to claim 14 wherein the steam cracked feedstock and thermal or cationic polymer are mixed in a weight ratio of between 10:1 and 1:1 before being subjected to Friedel-Crafts catalyzed polymerization.

17. A process according to claim 16 wherein said weight ratio is between 5.5:1 and 1.5:1.

18. A process according to claim 14 wherein a branched chain reactive monoolefin is added to the mixture to be polymerized in the presence of a Friedel-Crafts catalyst, the amount of branched chain reactive olefin being from 80 to 100% by weight based on the weight of thermal or cationic polymer in the polymerization mixture.

* * * * *